US006594494B1

United States Patent
Kakehi (10) Patent No.: US 6,594,494 B1
(45) Date of Patent: Jul. 15, 2003

(54) MOBILE COMMUNICATION TERMINAL (75) Inventor: Yuji Kakehi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/446,142

(22) PCT Filed: Jun. 30, 1998

(86) PCT No.: PCT/JP98/02943

§ 371 (c)(1),
(2), (4) Date: Dec. 17, 1999

(87) PCT Pub. No.: WO00/01174

PCT Pub. Date: Jan. 6, 2000

(51) Int. Cl.$^7$ .............................. H04Q 7/20; H04Q 7/00
(52) U.S. Cl. ...................... 455/437; 455/441; 370/333
(58) Field of Search ................................ 455/436, 437, 455/440–443, 67.1, 67.3, 67.6, 423, 425, 71, 438, 439; 714/704, 746; 370/331, 332, 333

(56) References Cited

U.S. PATENT DOCUMENTS

| 5,117,502 A | * | 5/1992 | Onoda et al. ................. 455/437 |
| 5,239,667 A | * | 8/1993 | Kanai .......................... 455/441 |
| 5,432,842 A | * | 7/1995 | Kinoshita et al. ............ 455/440 |
| 5,450,473 A | * | 9/1995 | Shiotsuki et al. ............ 455/441 |
| 5,491,834 A | * | 2/1996 | Chia .......................... 455/441 |
| 5,673,307 A | * | 9/1997 | Holland et al. .............. 455/436 |
| 5,825,761 A | * | 10/1998 | Tanaka et al. ............... 370/333 |
| 5,884,178 A | * | 3/1999 | Ericsson et al. ............. 455/441 |
| 5,943,606 A | * | 8/1999 | Kremm et al. ............... 455/12.1 |
| 5,991,901 A | * | 11/1999 | Mulford et al. .............. 455/421 |
| 6,052,598 A | * | 4/2000 | Rudrapatna et al. ......... 455/456 |
| 6,243,844 B1 | * | 6/2001 | Tonks .......................... 714/758 |
| 6,256,500 B1 | * | 7/2001 | Yamashita ................... 455/441 |
| 6,275,701 B1 | * | 8/2001 | Cerwall ....................... 455/436 |
| 6,393,281 B1 | * | 5/2002 | Capone et al. ............... 455/428 |

FOREIGN PATENT DOCUMENTS

JP  40-6292258 A  10/1994

* cited by examiner

Primary Examiner—Tracy Legree
(74) Attorney, Agent, or Firm—Rothwell, Figg, Ernst & Manbeck (57) ABSTRACT A reference pattern comparing means 14 detects the number of error bits, using a reference pattern data portion embedded in the received signal. An error correcting means 15 detects the number of the corrected bits in the user data portion in the signal. The bit error rate measuring means 16 measures the bit error rate, on the basis of the number of the error bits and the corrected bits. The electric field level measuring means 17 measures the level of the electric field of the received signal. The electric field correcting means 18 corrects the level of the electric field, on the basis of the bit error rate. The control of the handing over of the radio communication channel is carried out, on the basis of the corrected electric field.

2 Claims, 9 Drawing Sheets

MOBILE COMMUNICATION TERMINAL

TECHNICAL FIELD

The present invention relates to a mobile terminal for use in a mobile communication system. Specifically, the present invention relates to a control of the handing over of the communication channel so as to continue the communication, when a mobile terminal moves from a base station cell of a current base radio station, which is communicating with the mobile terminal, to the base station cell of another base radio station. In a handing over procedure, a supplemental communication channel is provided to the communication channel of the new base radio station.

BACKGROUND ART

In a mobile communication system, when a mobile terminal moves from the base station cell of a communicating base radio station into the cell of a neighboring base radio station, it is necessary to hand over the communication channel to the neighboring base radio station, and to provide a supplemental channel to the neighboring base radio station so as to continue the communication.

Figure 1:
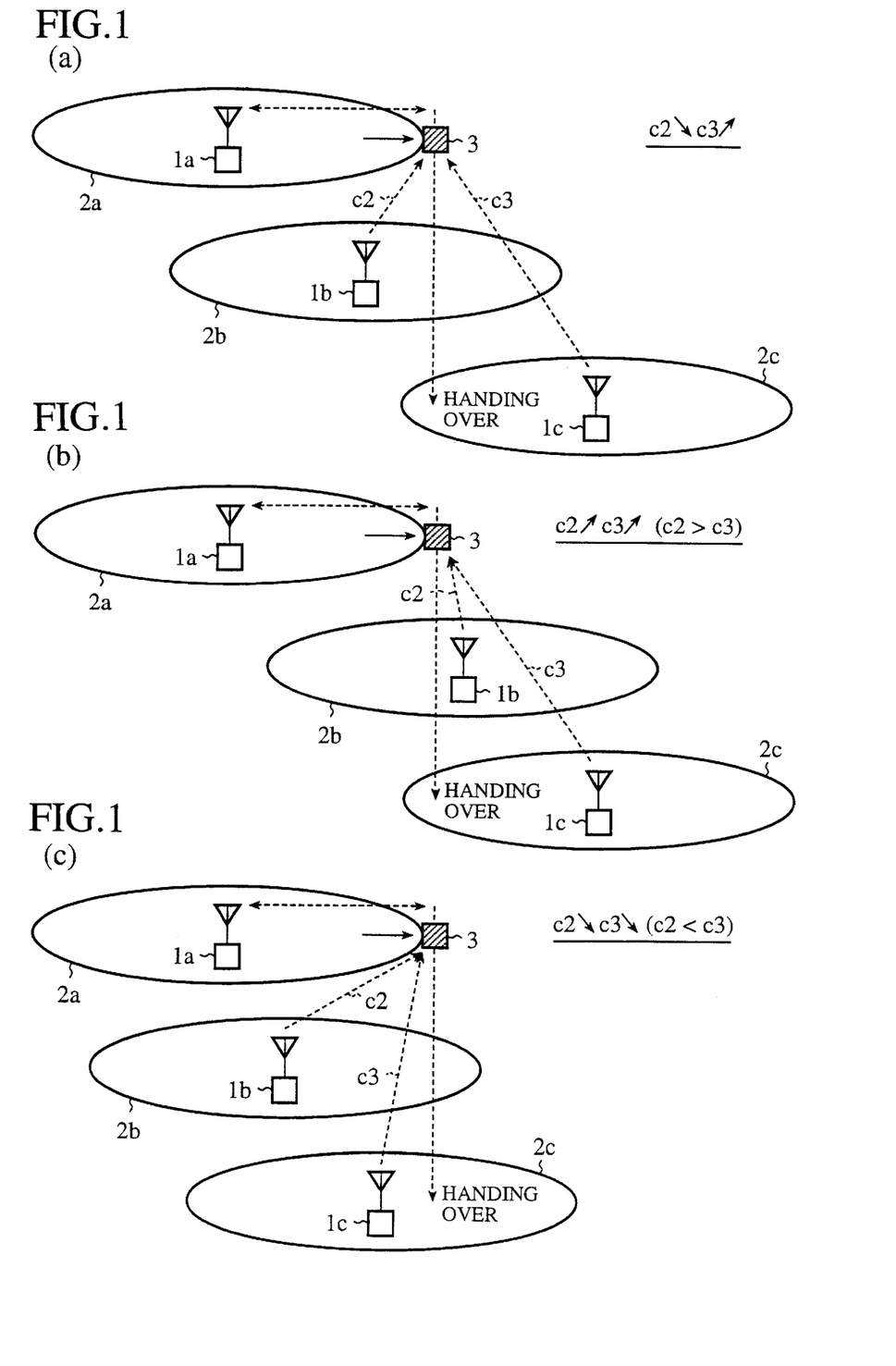
FIG. 1 is a schematic diagram of the control of handing over.

Japanese Patent Application JP-A-9-37327 discloses an example of the control of handing over in the prior art mobile communication system. FIG. 1 is a schematic diagram of the control of handing over disclosed therein. Reference numerals 1a, 1b, 1c denote base radio stations, each of which covers a base station cell 2a, 2b, 2c. Reference numeral 3 denotes a mobile terminal, which is moving in the area of the base station cells 2a, 2b, and 2c. The mobile terminal is communicating with one of the base radio stations.

Figure 2:
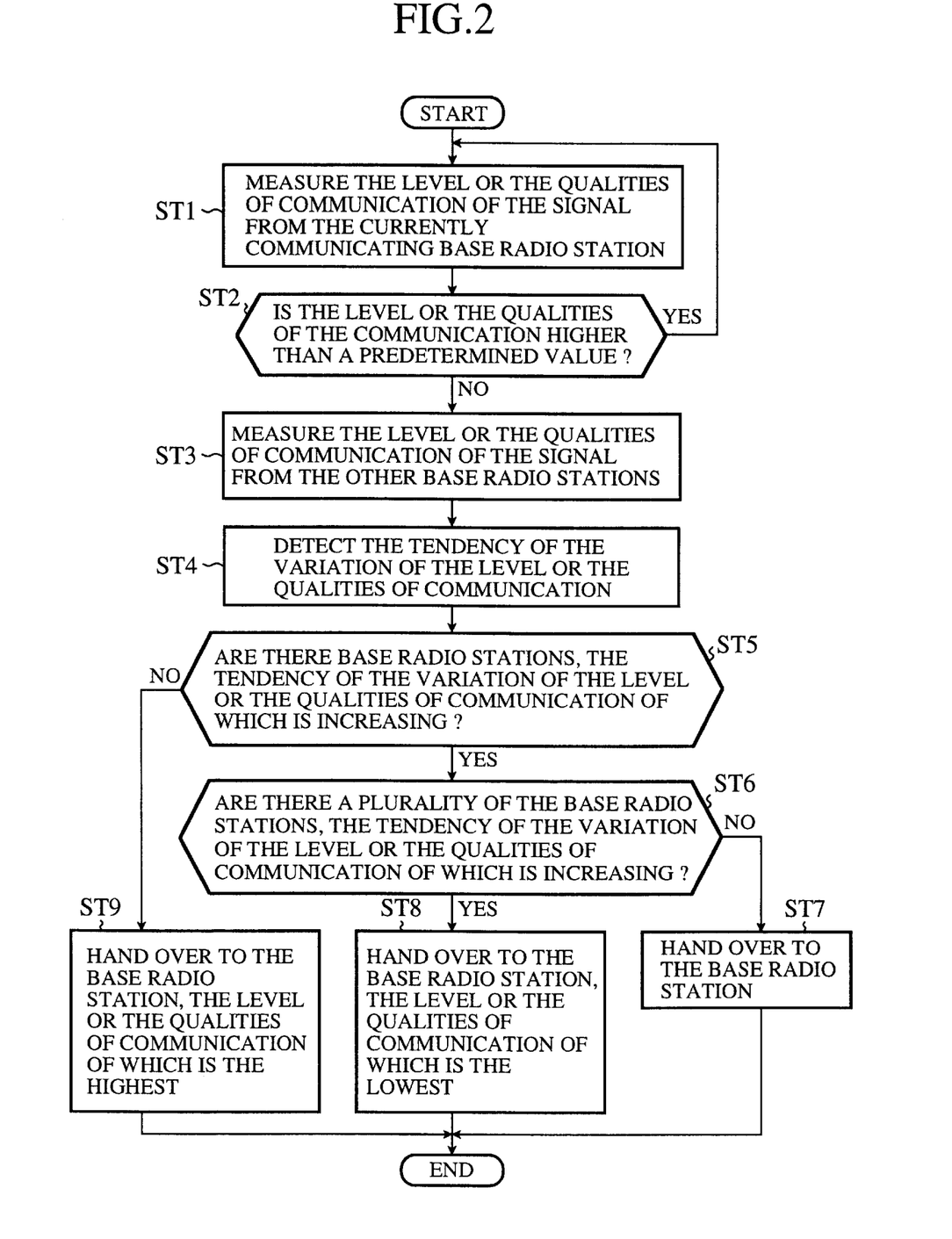
FIG. 2 is a flow chart showing the control procedure of the handing over in the prior art.

FIG. 2 is a flow chart showing the control of the handing over. At first, the mobile terminal 3 measures the level and the qualities of communication of the input signal received from the currently communicating base radio station 1a (step ST 1). The qualities of communication include, for example, a bit error rate and a frame error rate. Then the mobile terminal judges whether the received input level and the qualities of the communication are higher than a predetermined value (step St 2). When they are higher than predetermined values, the procedure returns to the step St 1. On the other hand, when they are less than the predetermined values, the mobile terminal measures the level and the qualities of communication of the input signals received from the other base radio stations 1b, 1c. (step St 3).

When the level of the input signal and the qualities of communication of the input signal received therefrom is higher than a predetermined value, the mobile terminal measures the tendency of changing rate of the level and the qualities of communication of the input signal received from the base radio stations, and judges whether they are increasing or decreasing (step ST 4).

Then the mobile terminal judges whether there are base stations, the tendency of changing rate of the level or the qualities of communication of the input signal therefrom is increasing (step ST 5). When there are at least one base radio station, which has such an increasing tendency, the mobile terminal judges whether a plurality of the radio base stations have such an increasing tendency or only one base radio station has such an increasing tendency (step ST 6).

When only one base station has such an increasing tendency, the communication is handed over to the base radio station (step ST 7). FIG. 1 (a) shows such a situation. In this case, the communication channel is handed over to the base station cell 2c of the base radio station 1c. On the other hand, when a plurality of base radio stations have an increasing tendency, the communication channel is handed over to the base radio station, the level of the input signal or the qualities of communication of the input signal received therefrom is the lowest among them (step ST 8). FIG. 1 (b) shows such a situation. In this case, the communication channel is handed over to the base station cell 2c of the base radio station 1c.

When it is judged that no base radio station has such an increasing tendency in the step ST 5, the communication channel is handed over to the base station cell of the base radio station, the level of the input signal or the qualities of communication of the input signal received therefrom is the highest (step ST 9). FIG. 1(c) shows such a situation. In this case, the communication channel is handed over to the base station cell 2c of the base radio station 1c.

Japanese patent application, JP-A-6-292258, discloses another example of the control of handing over in a mobile communication system, in which each of the mobile terminals in the mobile communication system has a function to generate a data for measuring the bit error rate (BER) of the input signal received by the mobile terminal. Each of the base radio stations has a function to receive the data to measure the bit error rate BER, so that the communication channel is handed over to the base station cell of the base radio station, the bit error rate BER of which is the smallest.

Figure 3:
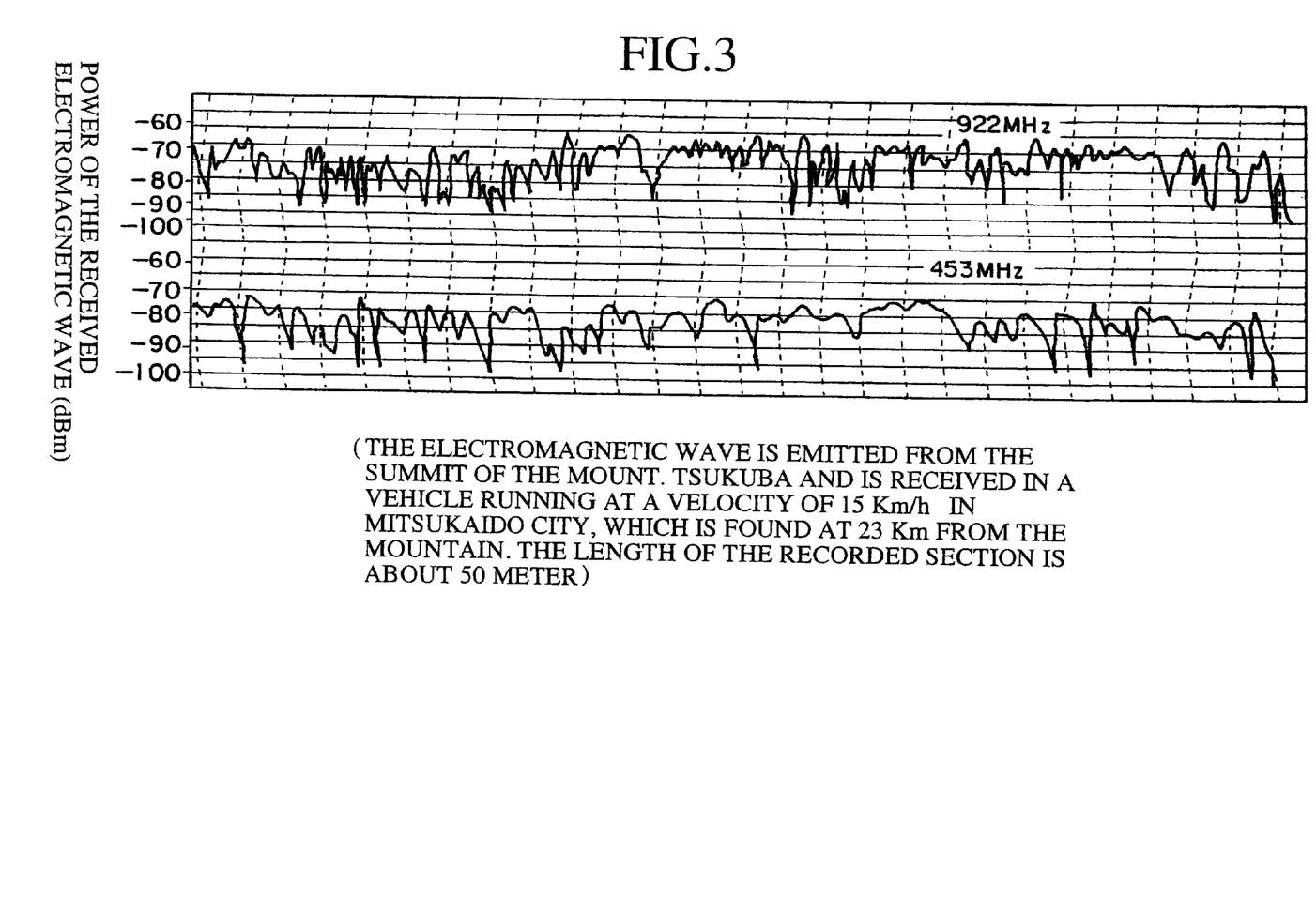
FIG. 3 is an example of the electric field depending on the position, due to the fading effect.

In general, it is known that a plurality of communication paths appear between a base radio station and a mobile terminal due to the diffraction and/or the reflection of the electromagnetic wave, and a multi-fading effect due to a plurality of communication paths is observed. In such a circumstance, the level of the input signal received by the mobile terminal shows a Rayleigh's distribution, as shown in FIG. 3. For avoiding the influence of the fading effect, a temporal mean value of the instantaneous level of the input signals in a certain time interval is often adopted as the level of the input signal. However, because the Rayleigh's distribution is a function of the spatial position, the change of the instantaneous measured level of the input signal depends on the state of the mobile terminal, for example, the velocity and direction of the movement. Therefore, it is difficult to eliminate the influence of the fading effect using such a temporal mean value.

When a moving vehicle, in which a mobile terminal is equipped, moves at a high velocity, it is necessary to shorten the smoothing time of the input signal, and the temporal resolution of the input signal has to be increased, in order to follow the rapid change of the level and/or the qualities of communication of the input signal. On the other hand, when the moving vehicle moves at a low velocity or is nearly stopping, the time for smoothing the input signal has to be long so as to increase the preciseness of the measurement. That is because a simultaneous actuation of a plurality of channels for handing over has to be prevented. Such simultaneous actuation can take place at a marginal area of a base station cell of a base radio station, due to the chattering phenomenon of the input level or qualities of communication of the input signal. However, the mobile terminal of a mobile communication system in the prior art has no means to detect the velocity of the moving object.

When a moving vehicle, in which a mobile terminal is equipped, moves at a high velocity, it is necessary to shorten the smoothing time of the input signal, and the temporal resolution of the input signal has to be increased, in order to follow the rapid change of the level and/or the qualities of communication of the input signal. On the other hand, when the moving vehicle moves at a low velocity or is nearly stopping, the time for smoothing the input signal has to be long so as to increase the preciseness of the measurement. That is because a simultaneous actuation of a plurality of channels for handing over has to be prevented. Such simultaneous actuation can takes place at a marginal area of a base station cell of a base radio station, due to the chattering phenomenon of the input level or qualities of communication of the input signal. However, the mobile terminal of a mobile communication system in the prior art has no means to detect the velocity of the moving object.

It is well known that the frequency of an electromagnetic wave measured in a moving object is shifted compared to the frequency measured in a static system due to the Doppler effect. The frequency $f_0$ measured in a moving system can be expressed as follows:

$$f_0 = f - k \cdot v \quad (1)$$

where f is the frequency measured in a static system, v is the velocity vector of the moving system, and k is the wave number vector of the electromagnetic wave.

The clock in a mobile terminal is deviated from that of the base radio station. Thus, in such a mobile communication system, the frequency of the mobile terminal is pulled to the frequency of the clock of the base radio station so as to receive the electromagnetic signal from the base radio station. Thus, the frequency deviation $\Delta f$ of the measured signal includes the frequency deviation $f_{offset}$ between the clocks as well as the frequency deviation due to the Doppler effect:

$$\Delta f = f_{offset} - k \cdot v \quad 2)$$

In a TDMA type communication system, a time slot is allocated to each of the communicating mobile terminals. The time slots allocated to a plurality of mobile terminals can overlap in the base radio station due to the delay of the propagation of electromagnetic wave. For avoiding the overlapping, the base radio station controls finely the signal sending timing from each of the mobile terminals, by setting a time alignment, which instructs the change of the sending timing from each of the mobile terminal. That is to say, a mobile terminal found in a far point from the base radio station begins to send signals at an advanced timing compared to a mobile terminal found in a nearer point to the base radio station The starting time to send signals from a mobile terminal is determined on the basis of the receiving time of the signal from the base radio station, and is changed by the time alignment, which instructs how long the sending timing shall be advanced. Therefore, the distance between the mobile terminal and the base radio station can be detected from the time difference between the receiving timing and the sending timing of the signal. When the mobile terminal is moving, the time alignment is changed at every moment. And when the mobile terminal is nearly stopping, the time alignment is almost constant.

Figure 4:
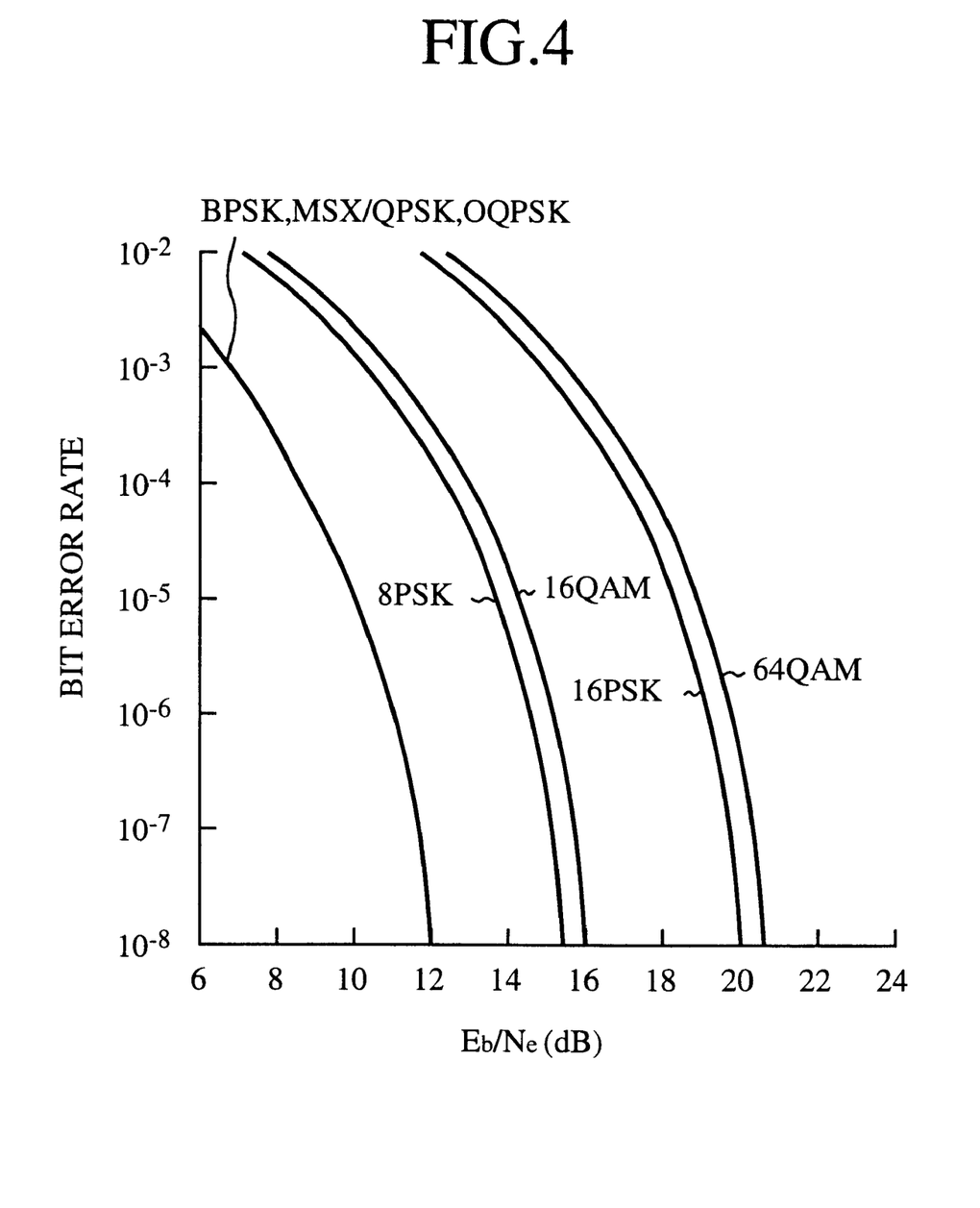
FIG. 4 is a relation between the bit error rate BER and the proportion of the bit energy to noise density.

By the way, there is a relation between the proportion Eb/NO, which is a proportion of bit energy to noise density, and the bit error rate BER. An example of the relation is shown in FIG. 4. This relation depends only on the characteristics of the receiver, and does not depend on the environment. According to this relation, even when the electric field of the received electromagnetic wave is strong, if the noise contained in the received signal is large, a small proportion Eb/N0 and a large bit error rate BER are observed.

The qualities of a communication channel can be substantially estimated by the bit error rate BER. However, in a mobile communication system, the measurement of the bit error rate BER is difficult. Thus, the proportion $Eb/N_0$ is often employed in place of the bit error rate BER. However, in this case, even when the level of the received signal is large, if the intensity of the interference wave or noise are still larger, and the mobile communication system has no means to measure the moving velocity of the moving vehicle, it is difficult to adjust the smoothing time of the input signal, corresponding to the moving velocity of the moving vehicle. Thus, it is difficult to avoid the simultaneous actuation of a plurality of the handing over procedures.

The qualities of the communication channel can be evaluated according to the level of the electric field of the received signal. In such a case, however, even when the level of the received signal is large, if the intensity of the interference wave or noise are still larger, the signal to noise ratio S/N decreases apparently. Thus, in such a case, the qualities of a communication channel is evaluated to be rather low contrary to the actuality.

An object of the present invention is to eliminate these problems.

Another object is to propose a mobile terminal for a mobile communication system, comprising a hand over controlling means, which performs a procedure to select the best base radio station, even when the mobile terminal is in a fading circumstance, so that the number of the handing over actuation times is reduced as least as possible, so as to avoid the deterioration of the qualities of communication and to reduce the traffic of the controlling signals.

DISCLOSURE OF THE INVENTION

In an embodiment of the present invention, the mobile terminal for a mobile communication system comprises: an electric field level measuring means for measuring the level of the electric field of the signal received from the base radio station; a bit error rate measuring means for measuring the bit error rate of the signal received from the base radio station; an electric field correcting means for correcting the level of the electric field measured by the electric field level measuring means, on the basis of the bit error rate measured by the bit error rate measuring means. And the handing over between the radio communication channels is controlled on the basis of the electric field corrected by the electric field correcting means.

According to this structure, the qualities of communication between the mobile terminal and the base radio station after the handing over is improved, and the continuous actuation of the handing over procedures seldom takes place. Thus the increase of the traffic due to the continuous actuation of the handing over procedures can be prevented.

In another embodiment of the present invention, the mobile terminal for a mobile communication system further comprises: a reference pattern comparing means for comparing the reference pattern data portion, which is embedded in the data received from the base radio station, with a reference pattern stored in the mobile terminal, so as to detect the number of the error bits contained in the reference pattern data portion; and an error correcting means for correcting the user data portion in the received data and for detecting the number of the corrected bits; wherein the bit error rate measuring means measures the bit error rate of the receive signal, on the basis of the number of the error bits in the reference pattern data portion, which is measured by the reference pattern comparing means, and the number of the corrected bits in the user data portion, which is detected by the error correcting means.

In another embodiment of the present invention, the mobile terminal for a mobile communication system comprises: an electric field level measuring means for measuring the level of the electric field of the signal received from the base radio station; a mobile terminal velocity measuring means for measuring the velocity of the mobile terminal with respect to the base radio station. And the handing over between the radio communication channels is controlled on the basis of the velocity measured by the mobile terminal velocity measuring means and the level of the electric field of the received signal, which is measured by the electric field level measuring means.

As a result, the qualities of communication after the handing over is improved. And a continuous actuation of the handing over procedures seldom takes place. Thus, the increase of the traffic due to the continuous actuation of the handing over can be prevented.

In another embodiment of the present invention, the mobile terminal for a mobile communication system comprises: an electric field forecasting means for forecasting the level of the electric field of the signal to be received in the future, on the basis of the level of the electric field measured by the electric field measuring means and the moving velocity of the mobile terminal with respect to the base radio station, which is measured by a mobile terminal velocity measuring means. The handing over between the radio communication channels is controlled, using the level of the electric field forecasted by the electric field forecasting means.

It is easy to perform a procedure to control the handing over to select the base radio station, the forecasted level of the electric field of the signal to be received therefrom is the highest, as the base radio station to be handed over.

In another embodiment of the present invention, the mobile terminal for a mobile communication system further comprises: a Doppler frequency detecting means for detecting the Doppler frequency of the signal received from the base radio station. And a mobile terminal velocity measuring means measures the moving velocity of the mobile terminal with respect to the base radio station, on the basis of the Doppler frequency, which is detected by the Doppler frequency detecting means.

The fact that the Doppler frequency detected by the Doppler frequency detecting means is "positive" means that the mobile terminal is moving towards the base radio station, and the fact that the Doppler frequency is "negative" means that the mobile terminal is moving in the direction to separate from the base radio station. The absolute value of the Doppler frequency is proportional to the moving velocity of the mobile terminal in the propagation direction of the electromagnetic wave.

The Doppler frequency can be measured without being influenced by the fading effect. Thus, it is possible to detect precisely whether the mobile terminal is approaching to the base radio station.

In another embodiment of the present invention, the mobile terminal for a mobile communication system comprises: an automatic frequency controlling means, which introduces in itself the frequency of the signal received from the base radio station. And the Doppler frequency detecting means detects the Doppler frequency, from the frequency deviation between the frequency introduced in by the automatic frequency controlling means and the clock frequency of the mobile terminal.

In another embodiment of the present invention, the mobile terminal for a mobile communication system further comprises: a propagation delay detecting means for detecting the propagation delay of the electromagnetic wave between the mobile terminal and the base radio station; and a distance detecting means for detecting the distance between the mobile terminal and the base radio station, on the basis of the propagation delay detected by the propagation delay detecting means. And the mobile terminal velocity measuring means measures the velocity of the mobile terminal with respect to the base radio station, on the basis of the time variation of the distance detected by the distance detecting means.

In this case, the qualities of communication between the mobile terminal and the base station after the handing over is improved. And a continuous actuation of the handing over procedures seldom takes place. Thus the increase of traffic due to the handing over can be prevented.

In another embodiment of the present invention, the mobile terminal for a mobile communication system comprises a timing comparator which compares the timing of the signal sending from the mobile terminal and the timing of signal receiving from the base radio station so as to detect the difference between them. And the distance between the mobile terminal and the base radio station is measured, on the basis of the detected difference between the timing of the signal sending from the mobile terminal and the timing of signal receiving from the base radio station. In this case, the detected distance between the mobile terminal and the base radio station is hardly influenced by the fading effect. Thus, it is possible to detect precisely whether the mobile terminal is approaching to the base radio station or not.

BEST MODES FOR CARRYING OUT THE INVENTION

Best modes for carrying out the present invention is explained below, referring to the accompanied drawings, for more precise explanation of the present invention.

Embodiment 1

Figure 5:
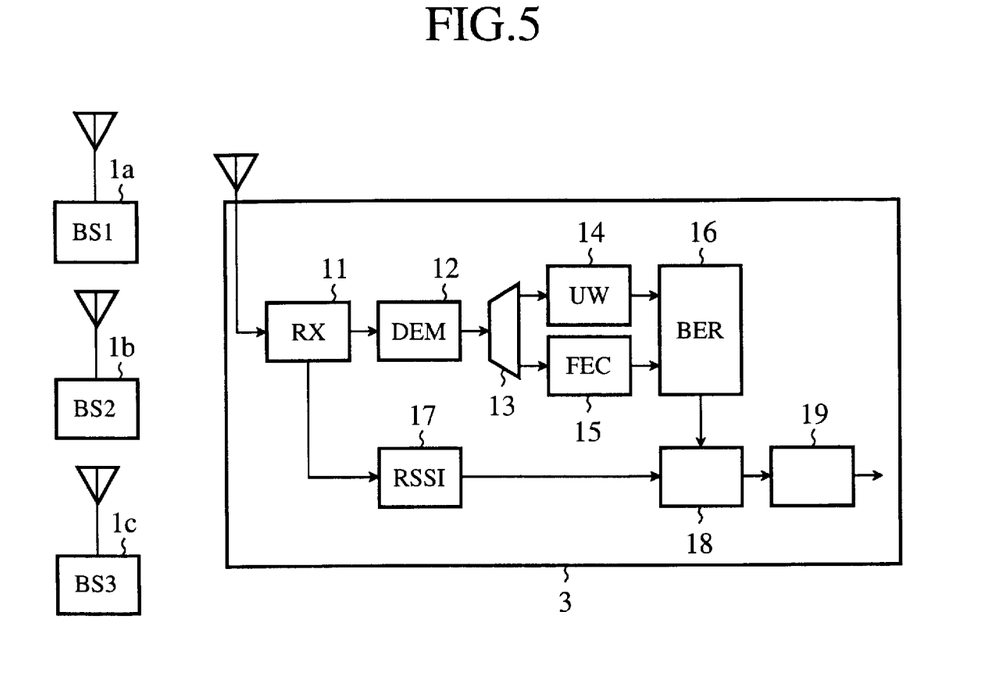
FIG. 5 is a block diagram of the mobile terminal for a mobile communication system according to the first embodiment of the present invention.

FIG. 5 shows a block diagram of the mobile terminal for a mobile communication system according to the first embodiment of the present invention. In the drawing, reference numerals 1a, 1b, 1c denote base radio stations. A mobile terminal 3 of this mobile communication system is moving in the area of base station cells covered respectively by the base radio stations 1a, 1b, 1c. These components correspond to those referred to the same reference numeral in FIG. 1.

A receiving means 11 sets a receiving frequency, and receives the signal from the base radio stations 1a, 1b, 1c, then detects the received signals. The signal detected by the receiving means 11 is demodulated by a demodulator 12. The demodulated data is separated into a reference pattern data portion and a user data portion by a demultiplexer 13. A reference pattern comparing means 14 compares the reference pattern data portion, separated by the demultiplexer 13, with a reference pattern stored in the mobile terminal to detect the number of error bits in the reference pattern data portion. An error correction means 15 corrects errors contained in the user data portion separated by the demultiplexer 13 and counts the number of the corrected bits.

A bit error rate measuring means 16 calculates the bit error rate from the number of error bits, which are contained in the reference pattern data portion and are detected by the reference pattern comparing means 14, and the number of the corrected bits in the user data portion, which are corrected by the error correction means 15.

An electric field level measuring means 17 measures the level of the electric field of the received signal, which is received and detected by the receiving means 11. An electric field correcting means 18 corrects the level of the electric field, which is measured by the electric field level measuring means 17, on the basis of the bit error rate calculated by the bit error rate measuring means 16. A controller 19 actuates a procedure for handing over the radio communication channel, on the basis of the electric field level corrected by the electric field correcting means 18.

Each of the mobile terminals 3 in the mobile communication system comprises these receiving means 11, demodulator 12, demultiplexer 13, reference pattern comparing means 14, error correcting means 15, bit error rate measuring means 16, electric field level measuring means 17, electric field correcting means 18 and controller 19.

Figure 6:
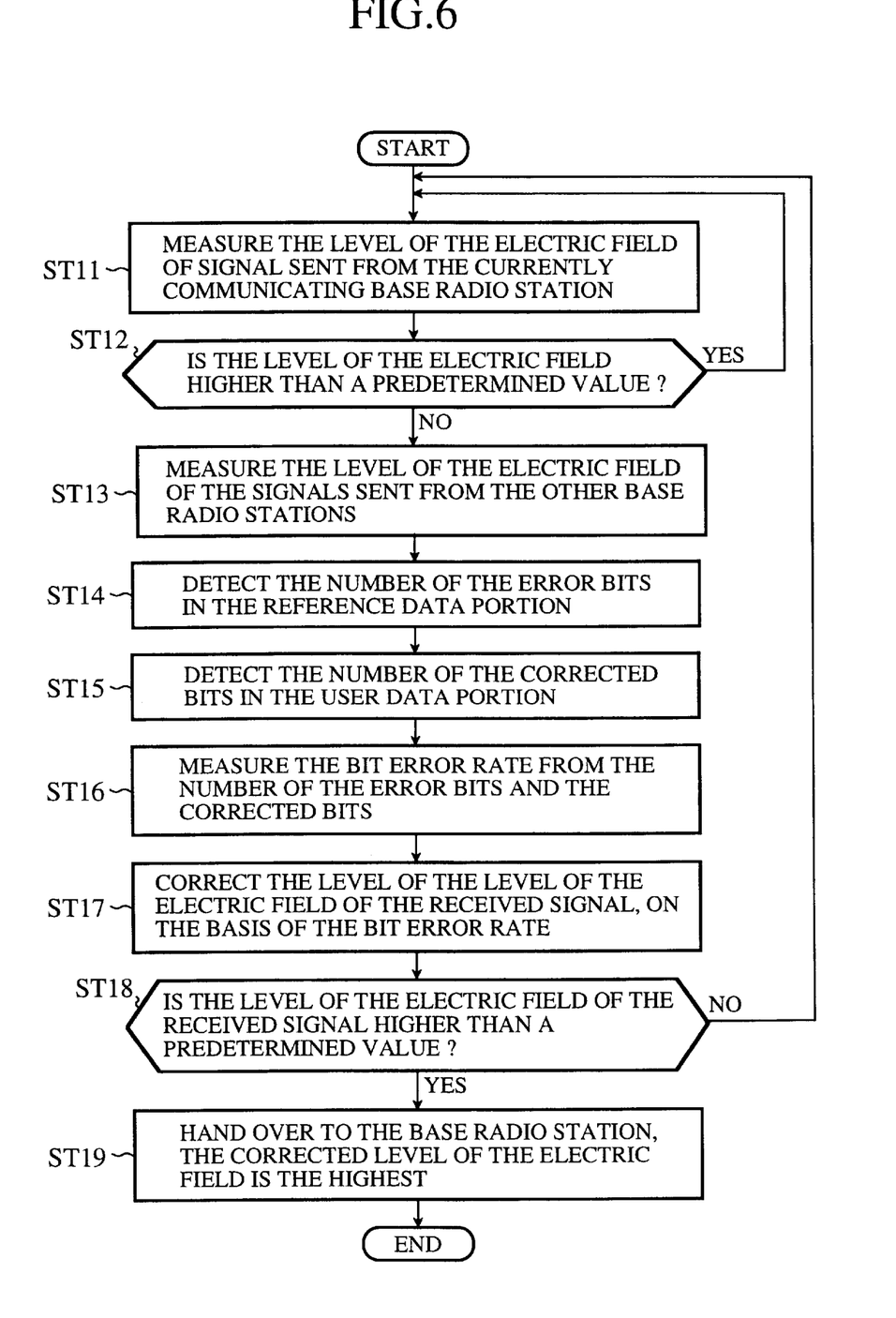
FIG. 6 is a flow chart of the handing over procedure in the first embodiment of the present invention.

The function of the embodiment 1 is explained below:

FIG. 6 is a flow chart of the handing over procedure in such a mobile terminal 3 in a mobile communication system. The function is explained, assuming that the base station cells covered by each of the base radio stations 1a, 1b, 1c are overlapping at their marginal portions. And, the mobile terminal 3 is communicating with the base radio station 1a currently, and the mobile terminal 3 can receive also the control signal from the other base radio stations 1b, 1c.

In the mobile terminal 3, the receiving means 11 receives the signal from the base radio station 1a and detects it. The electric field level measuring means 17 measures the level of the electric field of the signal, which is received and detected by the receiving means 11 (step ST11). The electric field level measured by the electric field measuring means 17 is compared with a predetermined value (step ST12). When the level is higher than the predetermined value, the procedure returns to the step ST 11. On the other hand, when the level is less than the predetermined value, the level of the electric field of a control signal from the base radio stations 1b, 1c is measured by the electric field level measuring means 17 (step ST13).

Meanwhile, the demodulator 12 in the mobile terminal 3 demodulates the signal received and detected by the receiving means 11. And the demultiplexer 13 separates the signal demodulated by the demodulator 12 into a user data portion and a reference pattern data portion. The reference pattern data portion is previously embedded into the signal so as to be used in the bit error rate detecting procedure. The reference pattern comparing means 14 compares the reference pattern data portion separated by the demultiplexer 13 with a previously stored reference pattern, and counts the number of the error bits in the reference pattern data portion (step ST 14).

The error correcting means 15 corrects the error bits in the user data portion separated by the demultiplexer 13, and detects the number of the corrected bits (step ST 15). The bit error rate measuring means 16 calculates the bit error rate from the number of the error bits in the reference pattern data portion, which is detected by the reference pattern comparing means 14, and the number of the corrected bits in the user data portion, which is detected by the error correcting means 15 (step ST 16).

The electric field correcting means 18 corrects the level of the electric field of the control signal, which is received from the base radio stations 1b, 1c, using the bit error rate calculated by the bit error rate measuring means 16 for each of the base radio stations (step ST17). The electric field level corrected by the electric field correcting means 18 is judged whether it is higher than a predetermined value (step ST 18). When the level is less than the predetermined value, the procedure returns to the step ST 11. On the other hand, when the level is higher than the predetermined value, the controller 19 in the mobile terminal 3 selects the base radio station (for example, base radio station 1c) which corresponds to the highest corrected electric field level. The selected base radio station is reported to the current base radio station 1a. A handing over procedure among the mobile terminal 3, the currently communicating base radio station 1a, and the selected base radio station 1c is actuated (step ST19).

In the embodiment 1, as explained above, when there are a plurality of base radio stations, which can be handed over, one base radio station is selected, according to the following procedures:

The level of electric field of the signal from each of the base radio stations is measured;

After demodulation of the signal, the bit error rate is calculated, on the basis of the number of error bits which is detected using a reference pattern data portion embedded in the received signal, and the number of corrected bits in the user data portion;

The level of the control signal from each of the base radio stations is corrected, using the bit error rate;

A base radio station to be handed over is selected, using the corrected level of the control signal.

As a result, even when the level of the signal from a base radio station is high, if the signal to noise ratio of the signal from the base radio station is low due to overlapping obstacle waves etc, the handing over to such a base radio station can be prevented. Therefore, the deterioration of the qualities of communication after the handing over can be avoided. And when the deterioration of the qualities of communication after the handing over can be avoided, it is possible to reduce the number of the handing over.

Consequently, the stopping of communication at a split second due to handing over and/or the increase of traffic can be avoided.

Embodiment 2

Figure 7:
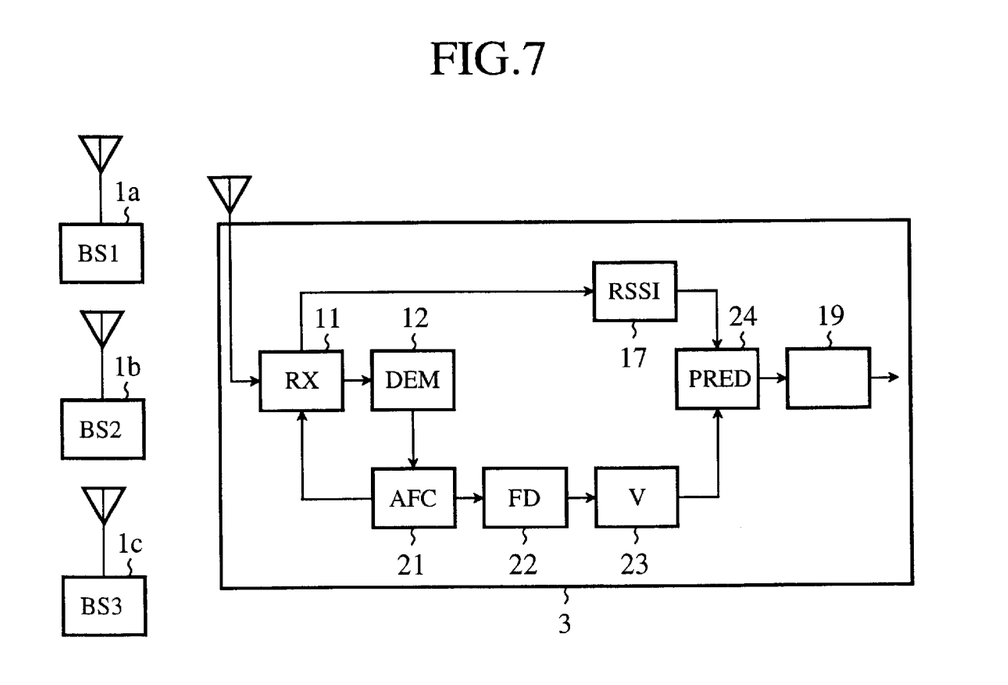
FIG. 7 is a block diagram of the mobile terminal for a mobile communication system according to the second embodiment of the present invention.

FIG. 7 is a block diagram of a preferred embodiment of the present invention, which is different from the embodiment 1 shown in FIG. 5. Components identical to or corresponding to those in FIG. 5 are referred to the same reference numeral. And those explanations are omitted.

In the figure, an automatic frequency controlling means 21 introduces the frequency of the signal from the base radio station, using the signal received and detected by the receiving means 11. And a Doppler frequency detecting means 22 detects the Doppler frequency from the shift of frequency between the received signal introduced by the automatic frequency controlling means 22 and the clock frequency of the mobile terminal 3. Then a mobile terminal velocity measuring means 23 measures the velocity of the mobile terminal 3 with respect to the base radio station 1a, on the basis of the Doppler frequency detected by the Doppler frequency detecting means 22.

An electric field forecasting means 24 forecasts the electric field in the future, for example, at a time after t seconds (t is changeable), on the basis of the level of the input signal, which is received by the receiving means 11 and measured by the electric field measuring means 17, and the moving velocity of the mobile terminal 3 with respect to the base radio station, which is measured by the mobile terminal velocity measuring means 23.

Figure 8:
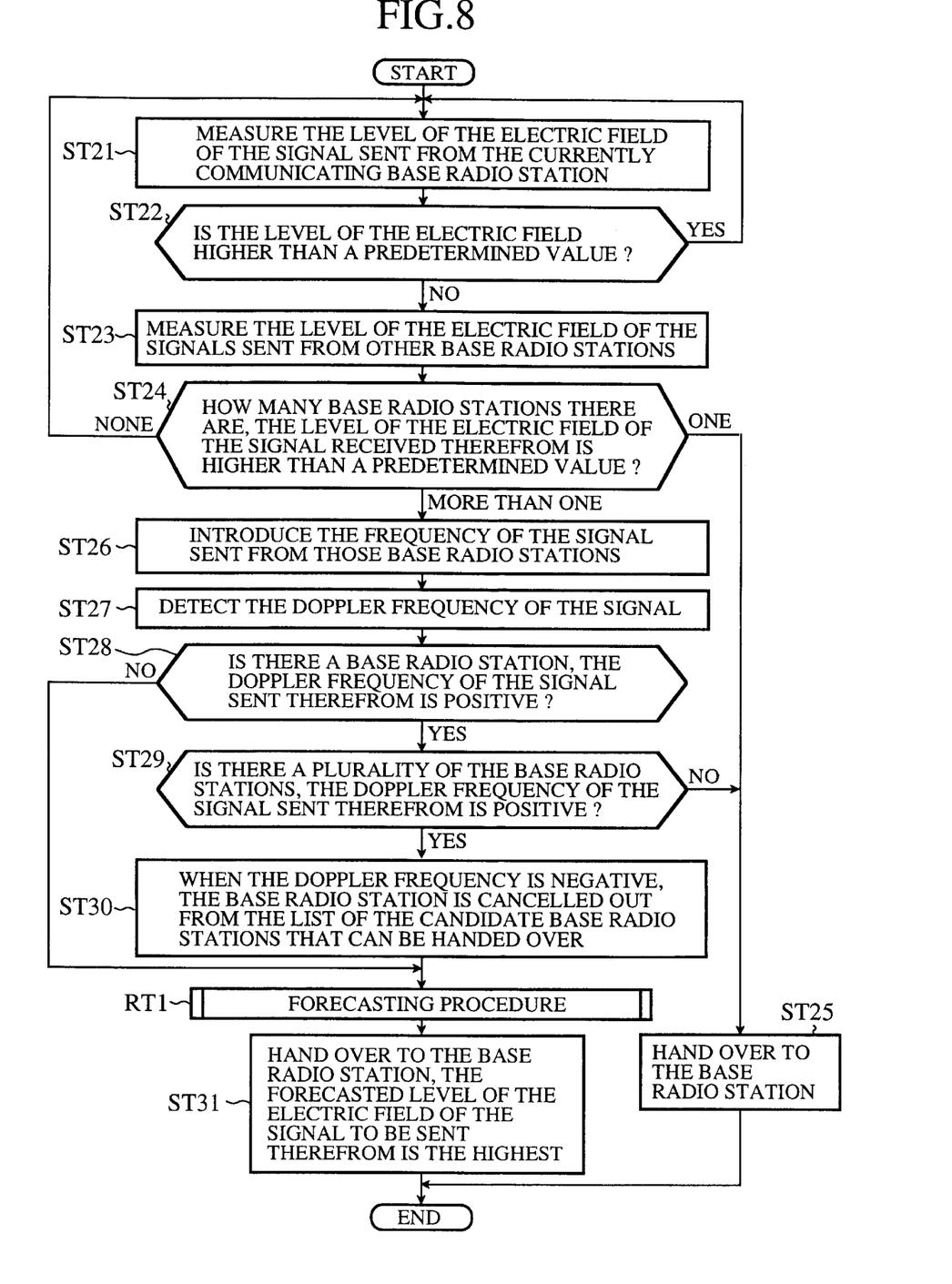
FIG. 8 is a flow chart of the handing over procedure in the second embodiment of the present invention.

The function of the embodiment 2 is explained below:

FIG. 8 is a flow chart of the handing over procedure in such a mobile terminal 3 in a mobile communication system. The function is explained, assuming that the base station cell covered by each of the base radio stations 1a, 1b, 1c are overlapping at their marginal portions. And, the mobile terminal 3 is currently communicating with the base radio station 1a, and the mobile terminal 3 can receive also the control signal from the other base radio stations 1b, 1c. These assumptions correspond to that in the explanation of the function of the embodiment 1.

Electric field level measuring means 17 in the mobile terminal 3 measures the level of the electric field of the signal, which is received from the base radio station 1a and detected by the receiving means 11 (step ST 21). The level of the electric field measured by the electric field level measuring means 17 is judged whether it is higher than a predetermined value (step ST 22). When it is higher than the predetermined value, the procedure returns to the step ST 21. On the other hand, when the level is less than the predetermined value, the electric field level measuring means 17 measures the level of the control signals from the base radio station 1b, 1c received by the receiving means 11 (step ST 23).

In the next step, it is judged how many base radio station there are, the level of the signal received therefrom by the receiving means 11 is higher than the predetermined value (step ST 24). When there is no such a base radio station, the procedure returns to the step ST 21. When there is only one base radio station, the level of the signal therefrom is higher than the predetermined value, the base radio station is selected as the base radio station to be handed over (step ST 25). And when there are a plurality of base radio stations, the level of the signal therefrom is higher than the predetermined value, the frequency of the signal therefrom is introduced in the automatic frequency controlling means 21 (step ST 26). Then the automatic frequency controlling means 22 measures the Doppler frequency for each of those base radio stations, on the basis of the deviation of frequencies between the clock signal of the base radio station, which is introduced in the automatic frequency controlling means 21, and the clock frequency of the mobile terminal 3 (step ST 27).

In the next step, it is judged whether there is a base radio station, the Doppler frequency of which is positive (step ST28). When there is no base radio station, the Doppler frequency of which is positive, the level of the signal from those base radio stations is forecasted by the electric field forecasting means 24, which performs the routine RT1. The routine will be explained later.

On the other hand, when there is at least one base radio station, the Doppler frequency of the signal therefrom is positive, it is judged how many base radio stations there are, the Doppler frequency therefrom is positive (step ST 29). When there is only one base radio station, the Doppler frequency therefrom is positive, the base radio station is selected as the base radio station to be handed over (step ST 25).

When there are a plurality of base radio stations, the Doppler frequency of signal therefrom is positive, the procedure goes to the routine RT1 to forecast the level of the electric field of the signal from those base radio stations. Before entering the routine RT1, the base radio stations, the Doppler frequency of the signal therefrom is negative, are excluded from the list of the candidate base radio stations that can be a base radio station to be handed over (step ST30).

Figure 9:
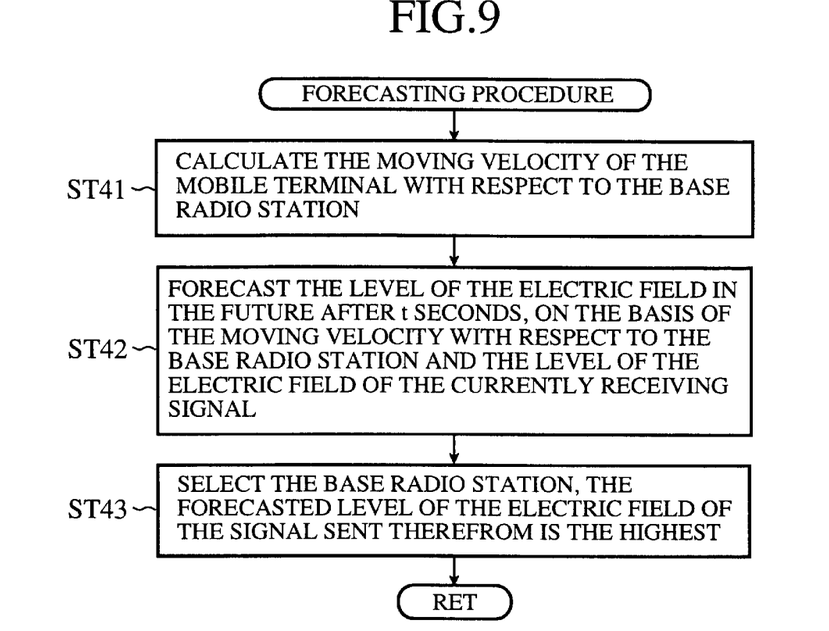
FIG. 9 is a detail of forecasting procedure in the handing over procedure in the second embodiment of the present invention.

In the routine RT1, the level of the electric field of the signal from the base radio stations are forecasted as follows. FIG. 9 is a flow chart of the procedure of forecasting in the routine RT1. The mobile terminal velocity measuring means 23 measures the moving velocity of the mobile terminal 3 with respect to the candidate base radio stations, on the basis of the Doppler frequency of the signal from those base radio stations (step ST 41). Then the electric field forecasting means 24 forecasts the level, in the future after t seconds, of the electric field of the signal from those base radio stations, on the basis of the current electric field of those signal and the moving velocity of the mobile terminal 3 with respect to those base radio stations (step ST 42). And the base radio station, the forecasted electric field of the signal received from which is the highest, is selected as the base radio station to be handed over (step ST 42). Then the procedure exits from the electric field forecasting routine RT1.

Exiting from the electric field forecasting routine RT1, the controller 19 of the mobile terminal 3 reports the selected base radio station 1c to be handed over to the currently communicating base radio station 1a. Corresponding to this report, a handing over procedure among the mobile terminal 3, the currently communicating base radio station 1a, and the selected base radio station 1c is actuated (step ST 31).

The fact that the Doppler frequency detected by the Doppler frequency detecting means 22 is positive means that the mobile terminal 3 is moving towards the base radio station. And the fact that the detected Doppler frequency is negative means that the mobile terminal 3 is moving in the direction to separate from the base radio station. The absolute value of the detected Doppler frequency is proportional to the moving velocity of the mobile terminal 3 in the propagation direction of the electromagnetic wave from the base radio station. Because the Doppler frequency can be observed without being influenced by the fading effect, it is possible to determine exactly whether the mobile terminal 3 is approaching to the base radio station or not.

In the embodiment 2, as explained above, when there are a plurality of candidate radio stations to be handed over, the Doppler frequency of the signal from those base radio stations are detected to measure the moving velocity of the mobile terminal with respect to each of the base radio stations, and the level of the electric field, in the future after t seconds, of the signal are forecasted, on the basis of the moving velocity and the present level of the electric field. And the base radio station, the forecasted electric field of which is the highest among those candidate base radio stations, is selected as the base radio station to be handed over.

As a result, the area that the mobile terminal can move using the base station cell of the same base radio station increases. Therefore, the number of times of the handing over decreases. Consequently, the stopping of communication at a split second due to the handing over as well as the increase of the traffic of the controlling signal can be prevented. Furthermore, because the moving velocity of the mobile terminal is measured on the basis of the Doppler frequency, the measurement is hardly influenced by the fading effect. And it is possible to detect exactly whether the mobile terminal is approaching to those base radio station.

Embodiment 3

Figure 10:
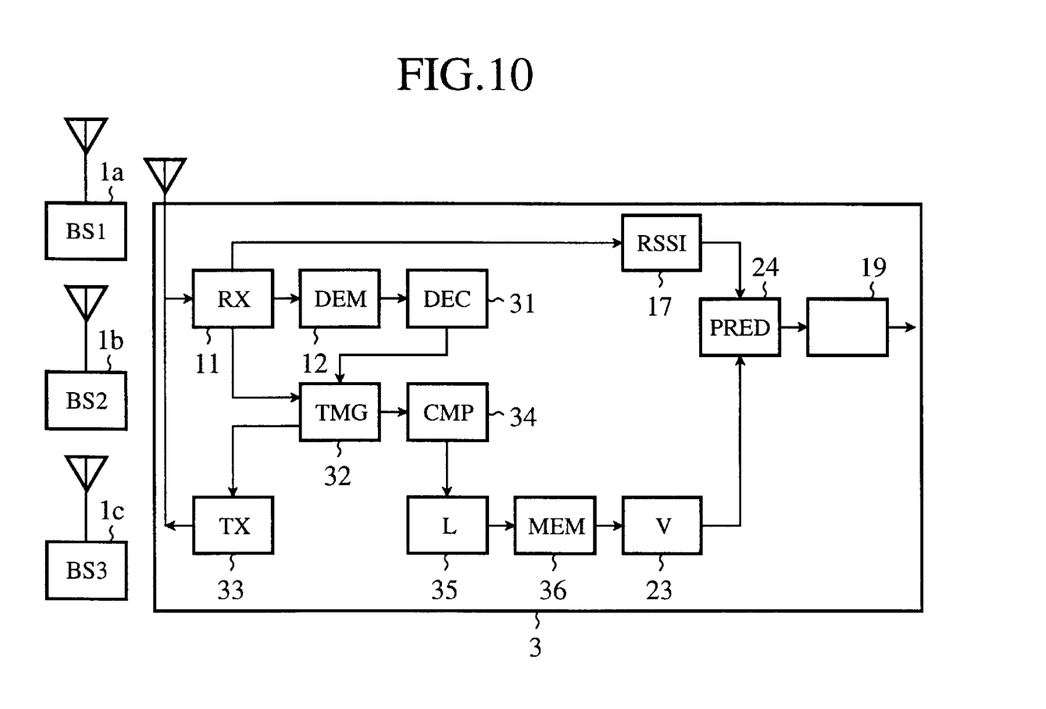
FIG. 10 is a block diagram of the mobile terminal for a mobile communication system according to the third embodiment of the present invention.

FIG. 10 is a block diagram of the mobile terminal for a mobile communication system according to a preferred embodiment 3, which is different from the first and second embodiments shown in FIGS. 5 and 7, of the present invention. Components in the figure identical to or corresponding to those shown in FIG. 7 are referred to the same reference numerals. And their explanation is omitted.

The demodulator 12 demodulates the received signal. And a decoder 31 decodes the signal demodulated by the demodulator 12, and extracts the control data therefrom, which was sent to the mobile terminal 3 from the base radio station. A sending timing changing means 32 changes the timing of the signal sending of the mobile terminal 3, according to the instruction from the base radio station, which is contained in the control data. A sending means 33 modulates the data to be sent and sends the signals at a timing determined by the sending timing changing means 32. A propagation delay detecting means 34 detects the delay of propagation between base radio stations and the mobile terminal. In this third embodiment, the propagation delay detecting means 34 compares the sending timing of the mobile terminal 3, which is determined by the sending timing changing means 32, and the receiving timing of the signal from the base radio station so as to detect the timing difference between them.

A distance detecting means 35 detects the distance between the mobile terminal 3 and the base radio station, on the basis of the timing difference between the signal sending timing and the signal receiving timing which is detected by the propagation delay detecting means 34. The time variation of the distance between the mobile terminal and the base radio station, which is detected by the distance detecting means 34, is stored in a measured distance storing means 36.

A mobile terminal velocity measuring means 23 measures the velocity of the mobile terminal 3 with respect to the base radio station, on the basis of the changing rate of the distance between the mobile terminal 3 and the base radio station. The principle of the distance detection of the mobile terminal velocity measuring means 23 in this embodiment is different from that of the mobile terminal velocity detecting means 23 in the second embodiment shown in FIG. 7, though they are referred to the same reference numeral.

Figure 11:
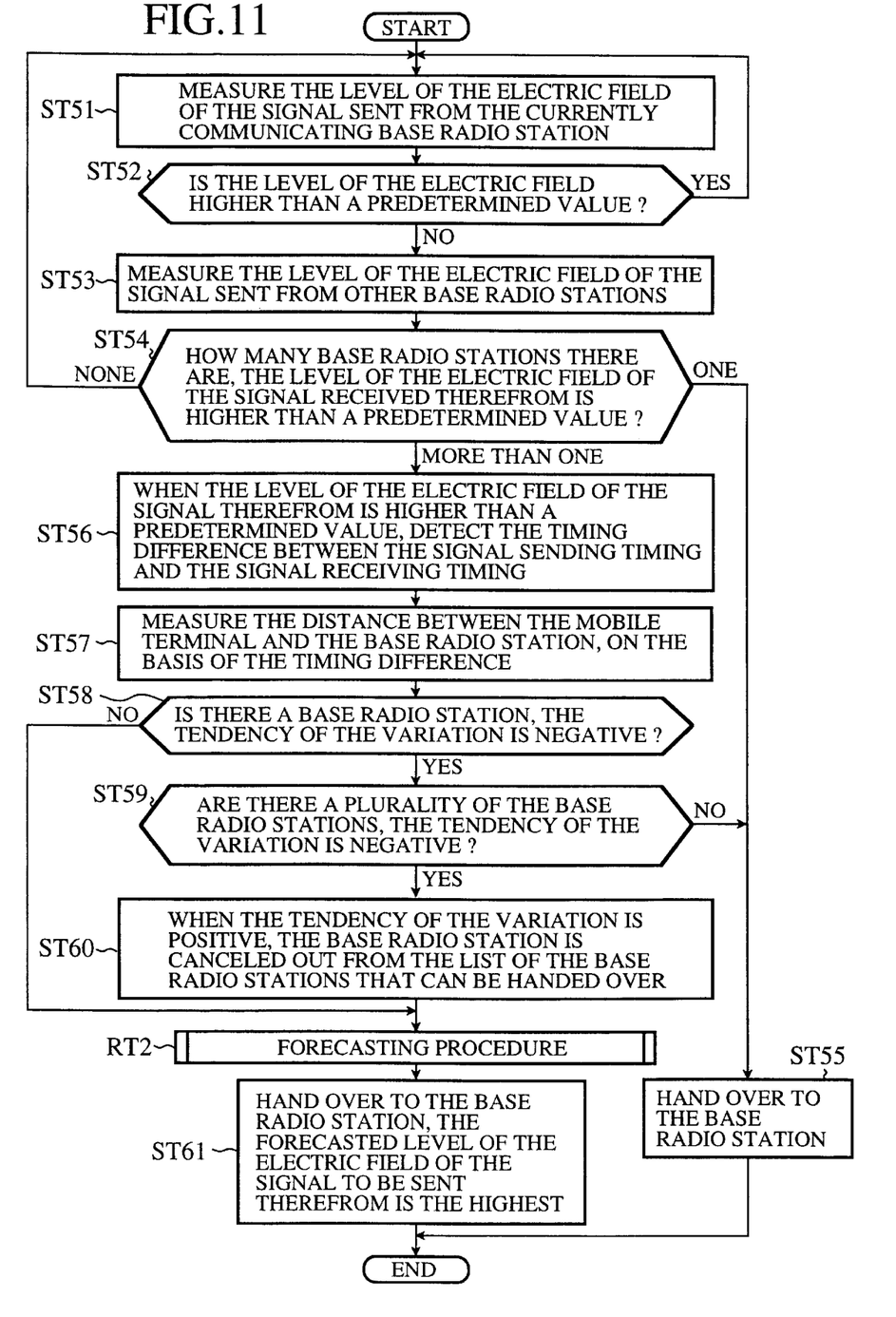
FIG. 11 is a flow chart of the handing over procedure in the third embodiment of the present invention.

The function of the mobile terminal for a mobile communication system according to the embodiment 3 is explained below:

FIG. 11 is a flow chart of the procedure of handing over in the mobile terminal 3 for a mobile communication, which is formed as shown in FIG. 10. The function is explained, assuming that the base station cells covered by each of the base radio stations 1a, 1b, 1c are overlapping at their marginal portions. And, the mobile terminal 3 is currently communicating with the base radio station 1a, and the mobile terminal 3 can receive also signals from the other base radio stations 1b, 1c. These assumptions correspond to that of the explanation of the function of the embodiments 1 and 2.

In this embodiment, the decoding means 31 of the mobile terminal 3 decodes the signal demodulated by the demodulator 12. When a control data from the base radio station is contained in the decoded signal, the decoding means 31 reports it to the sending timing changing means 32. When an instruction for changing the sending timing is contained in the decoded control signal, the sending timing changing means 32 sets the signal sending timing of the sending means 33, according to the instruction.

The receiving means 11 receives and detects the signal from the currently communicating base radio station 1a. The electric field level measuring means 17 in the mobile terminal 3 measures the level of the electric field of the received signal (step ST 51). It is judged whether the level of the electric field is higher than a predetermined value or not (step ST 52). When the level is higher than the predetermined value, the procedure returns to the step 51. When the level is less than the predetermined value, the receiving means 11 receives the control signal from the other base radio stations 1b, 1c, and the electric field level measuring means 17 measures the level of electric field of the received control signal from the other base radio stations 1b, 1c (step ST 53).

In the next step, it is judged how many base radio stations there are, the level of the electric field of the signal therefrom is higher than a predetermined value (step ST 54). When there is no base radio station, the level of the electric field thereof is higher than the predetermined value, the procedure returns to the step ST 51. When there is only one base radio station like that, the base radio station is selected as the base radio station to be handed over (step ST 55). When there are a plurality of base radio stations like that, the propagation delay detecting means 34 compares the receiving timing of signals from the base radio stations 1b, 1c and the timing of signal sending of the mobile terminal 3 so that the difference of the timings is detected (step ST 56).

Then the distances between the mobile terminal 3 and the base radio stations 1b, 1c are measured, on the basis of the difference of the signal sending timing and the signal receiving timing. The measured distances are sampled at every predetermined sampling interval, for example, at every t seconds (t is variable), and are stored in the measured distance storing means 36 (step ST 57).

The mobile terminal velocity measuring means 23 obtains the time variation of the read out distances between the mobile terminal 3 and the base radio stations 1b, 1c stored in the measured distance storing means 36. The mobile terminal velocity measuring means 23 judges whether there are base radio stations, the tendency of the time variation of the distance, which corresponds to the moving velocity of the mobile terminal 3, is negative (step ST 58).

When there is no base radio station, the tendency of the time variation of the distance is negative, a routine RT 2 for forecasting the level of the electric field of the received signal is immediately carried out by the electric field forecasting means 24.

The electric field level forecasting procedure in the routine RT 2 is substantially identical to that in the routine RT 1 in the second embodiment. The routine is carried out, following the flow chart shown in FIG. 9. However, the principle of calculation of the moving velocity of the mobile terminal 3 with respect to the base radio station in the step ST 41 is different from that in the second embodiment. Specifically, the moving velocity is measured, in the third embodiment, on the basis of the time variation of the distance between the mobile terminal 3 and the candidate base radio stations, the data of which is stored in the measured distance storing means 36.

In the step ST 58, when there is at least one base radio station, the tendency of the time variation of the distance is negative, it is judged how many base radio stations there are, the tendency of the time variation of the distance is negative (step ST 59). When there is only one base radio station, the tendency of the time variation of the distance is negative, the base radio station is selected as the base radio station to be handed over (step ST 55).

On the contrary, when there are a plurality of base radio stations, the tendency of the time variation of the distance is negative, the procedure enters into the routine RT 2 for forecasting the level of the electric field of the received signal. Before entering the routine RT 2, the base radio stations, the tendency of the time variation of the distance between the mobile terminal and those base radio station is positive, are cancelled from the list of the candidate base radio stations (step ST 60).

After exiting the routine RT 2 for forecasting the level of the electric field of the received signal, the controller 19 of the mobile terminal 3 reports the selected base radio station, for example, the base radio station 1c, to the currently communicating base radio station 1a. Corresponding to this report, a handing over procedure among the mobile terminal 3, the currently communicating base radio station 1a and the base radio station 1c to be handed over is actuated (step ST 61).

The receiving timing of the signal, which was sent from the base radio station in order that the propagation delay detecting means 34 compares the receiving timing of the signal with the sending timing of the signal from the mobile terminal 3, can be measured without being influenced by the fading effect. Therefore, also the distance between the mobile terminal and the base radio station, which is detected by the distance detecting means 35, is hardly influenced by the fading effect. As a result, it is possible to detect precisely whether the mobile terminal is approaching to the base radio station or not.

In the third embodiment, as explained above, when there are a plurality of candidate base radio stations to be handed over, the moving velocity of the mobile terminal with respect to the base radio station is measured, on the basis of the difference between the signal receiving timing and the signal sending timing, which is adjusted by an instruction from the base radio station; then the level of the electric field of the signal in the future after t seconds is forecasted, on the basis of the moving velocity and the present level of the electric field from the base radio station; and the base radio station, the forecasted level electric field of the signal therefrom is the highest, is selected as the base radio station to be handed over.

As a result, the area that the mobile terminal can move using the base station cell of one base radio station increases, therefore, the number of the times of the handing over decreases. Consequently, the stopping of communication at a split second due to the handing over as well as the increase of the traffic of the controlling signal can be reduced. The moving velocity of the mobile terminal is measured on the basis of the receiving timing of the signal, therefore, the measurement is hardly influenced by the fading effect. And it is possible to detect exactly whether the mobile terminal is approaching to the base radio station.

INDUSTRIAL APPLICABILITY

As explained above, in the handing over procedure in the mobile terminal for a mobile communication system according to an embodiment of the present invention, the level of the electric field of the signal from the base radio stations is measured, and after demodulating the signal, the bit error rate of the demodulated signal is measured. The base radio station, the level of the electric field of the signal sent therefrom is large and the bit error rate of the signal demodulated from the signal sent therefrom is low, is selected as the base radio station.

As a result, the qualities of communication between the mobile terminal and the base radio station after the handing over is improved. And a continuous actuation of the handing over procedures seldom takes place. Thus, the increase of the traffic due to the handing over can be prevented. The handing over procedure is hardly influenced by the fading effect, thus, it is possible to detect precisely whether the mobile terminal is approaching to the base radio station or not. Consequently, a large advantage can be obtained, when the mobile terminal for a mobile communication system according to this embodiment of the present invention is used in the control of the handing over for changing the base radio station.

In the mobile terminal for a mobile communication system according to an embodiment of the present invention, the level of the electric field of the signal from the base radio station is measured, and the Doppler frequencies of the signal received from the base radio stations are measured, on the basis of the introduced frequency of the signal from the base radio station, so that the moving velocity of the mobile terminal with respect to the base radio station is calculated; then the level of electric field in the future is forecasted, on the basis of the calculated moving velocity of the mobile terminal and the present level of the electric field of the signal received from the base radio station; and the base radio station, the forecasted level of the electric field of the signal therefrom is the largest, is selected as the base radio station to be handed over.

As a result, the qualities of communication between the mobile terminal and the base radio station after the handing over is improved. And a continuous actuation of the handing over procedures seldom takes place. Thus, the increase of the traffic due to the continuous handing over can be prevented. The distance, according to the present invention, is hardly influenced by the fading effect, therefore, it is possible to detect precisely whether the mobile terminal is approaching to the base radio station or not. Consequently, a large advantage can be obtained, when the mobile terminal for a mobile communication system according to the this embodiment of the present invention is used in the control of the handing over for changing the base radio station.

In the mobile terminal for a mobile communication system according to an embodiment of the present invention, the level of the electric field of the signal from the base radio station is measured, and the delay of propagation of the electromagnetic wave between the mobile terminal and the base radio station are measured so that the distance between the mobile terminal and the base radio station is calculated, on the basis of the delay of propagation; then the moving velocity of the mobile terminal with respect to the base radio station is calculated, on the basis of the time variation of the distance between the mobile terminal and the base radio station; and the level of electric field in the future is forecasted, on the basis of the calculated moving velocity of the mobile terminal and the present level of the electric field of the signal received from the base radio station; and finally the base radio station, the forecasted level of the electric field of the signal therefrom is the largest, is selected as the base radio station to be handed over.

As a result, the qualities of communication between the mobile terminal and the base radio station after the handing over is improved. And a continuous actuation of the handing over procedures seldom takes place. Thus, the increase of the traffic due to the handing over can be prevented. A large advantage can be obtained, when the mobile terminal for a mobile communication system according to this embodiment of the present invention is used in the control of the handing over for changing the base radio station.

When the distance between the mobile terminal and the base radio station is calculated from the difference between the signal receiving timing and the signal sending timing, which is adjusted by the instruction from the base radio station, because the measured distance is hardly influenced by the fading effect, thus it is possible to detect precisely whether the mobile terminal is approaching to the base radio station or not. Consequently, a large advantage can be obtained, when the mobile terminal for a mobile communication system according to this embodiment of the present invention is used in the control of the handing over for changing the base radio station.

What is claimed is:

1. A mobile terminal for a mobile communication system, said mobile terminal comprising:

an electric field level measuring means for measuring the level of the electric field of the signal received from the base radio station;

a bit error rate measuring means for measuring the bit error rate of the signal received from the base radio station;

an electric field correcting means for correcting the level of the electric field measured by the electric field level measuring means, on the basis of the bit error rate measured by the bit error rate measuring means; and a controller for controlling the handing over between radio communication channels, on the basis of the electric field corrected by the electric field correcting means.

2. The mobile terminal according to claim 1, further comprising:

a reference pattern comparing means for comparing a reference pattern data portion, which is embedded in the data received from the base radio station, with a reference pattern stored in the mobile terminal, so as to detect the number of the error bits contained in the reference pattern data portion; and an error correcting means for correcting a user data portion in the received data and for detecting the number of the corrected bits, wherein the bit error rate measuring means measures the bit error rate of the receive signal, on the basis of the number of the error bits in the reference pattern data portion, which is measured by the reference pattern comparing means, and the number of the corrected bits in the user data portion, which is detected by the error correcting means.

* * * * *